(12) United States Patent
Frost

(10) Patent No.: US 9,743,782 B1
(45) Date of Patent: Aug. 29, 2017

(54) RETAIL UPRIGHT SHELF EXTENDER

(71) Applicant: Vanguard Packaging, Inc., Kansas City, MO (US)

(72) Inventor: Jerry Ryan Frost, Kansas City, MO (US)

(73) Assignee: Vanguard Packaging, Inc., Kansas City, MO (US)

( * ) Notice: Subject to any disclaimer, the term of this patent is extended or adjusted under 35 U.S.C. 154(b) by 0 days.

(21) Appl. No.: 14/595,988

(22) Filed: Jan. 13, 2015

Related U.S. Application Data

(60) Provisional application No. 61/926,805, filed on Jan. 13, 2014.

(51) Int. Cl.
*B31D 5/04* (2017.01)
*A47F 5/00* (2006.01)
*F16M 13/02* (2006.01)

(52) U.S. Cl.
CPC .............. *A47F 5/00* (2013.01); *B31D 5/04* (2013.01); *F16M 13/02* (2013.01); *A47F 2005/0075* (2013.01)

(58) Field of Classification Search
CPC ........ B31D 5/0091; B31D 5/04; F16M 11/26; Y10T 29/49904; Y10T 29/49673; Y10T 29/5198; A47F 5/112; A47F 5/11
USPC ............................................. 211/72, 73, 135
See application file for complete search history.

(56) References Cited

U.S. PATENT DOCUMENTS

| | | | | |
|---|---|---|---|---|
| 4,638,745 A | * | 1/1987 | Sheffer | A47F 5/112 108/156 |
| 6,155,441 A | * | 12/2000 | Andersen | A47B 57/50 211/192 |
| 7,137,517 B2 | * | 11/2006 | Lowry | B65D 21/0215 206/586 |

FOREIGN PATENT DOCUMENTS

FR 2380129 A1 * 9/1978 ............. B29C 53/42

OTHER PUBLICATIONS

English translation of FR 2380129 A1.*

* cited by examiner

*Primary Examiner* — Jason L Vaughan
*Assistant Examiner* — Amanda Meneghini
(74) *Attorney, Agent, or Firm* — Kutak Rock LLP; Bryan P. Stanley

(57) ABSTRACT

A corrugated shelf extender having an upper section and a lower section is provided. The lower section is configured to be received by an inner area of a vertical support post. The upper section is configured to extend above the vertical support post so as to provide support for signage or the like. The lower section includes a channel that is configured so as to enable a section of the vertical support post that receives the lower section of the shelf extender to be simultaneously utilized by the shelf extender and one or more mounting lug. The corrugated shelf extender is manufactured from a flat piece of continuous corrugated material by folding the corrugated material so as to fabricate an inner portion and an outer portion. The inner portion includes an upper portion that nests within the outer portion and a lower portion that extends from the outer portion such that the upper section of the shelf extender includes the outer portion and the upper portion of the inner portion and the lower section of the shelf extender includes the lower portion of the inner portion.

7 Claims, 3 Drawing Sheets

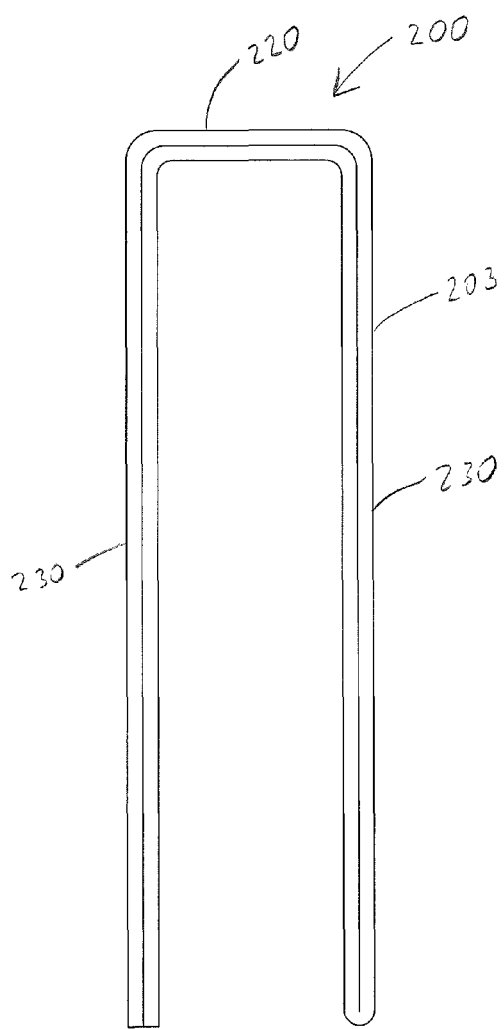
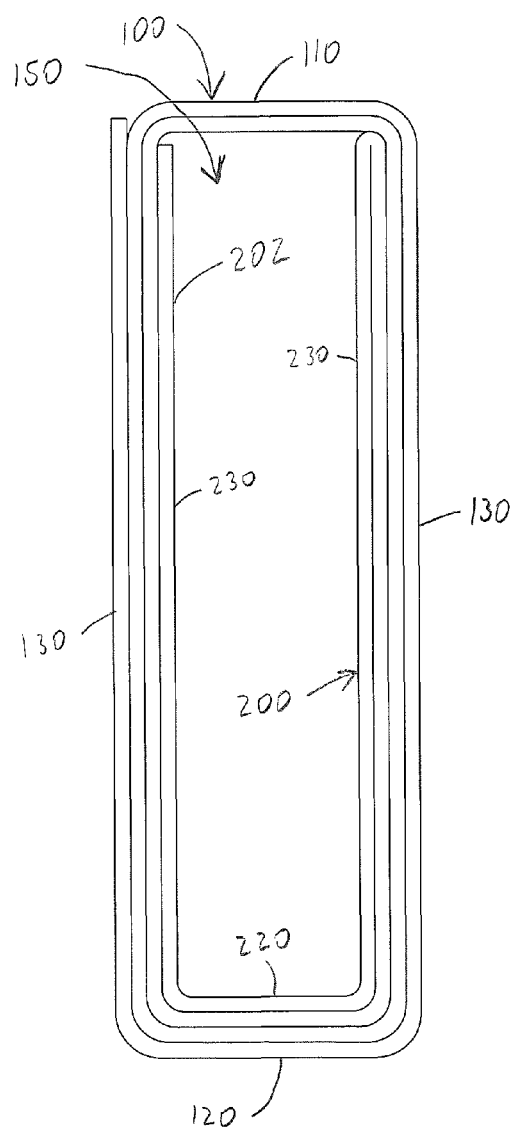
FIG. 3B
FIG. 3C

RETAIL UPRIGHT SHELF EXTENDER

CROSS-REFERENCE TO RELATED APPLICATIONS

This application claims priority pursuant to 35 U.S.C. 119(e) to U.S. Provisional Patent Application Ser. No. 61/926,805 filed Jan. 13, 2014, the entire disclosure of which is incorporated herein by reference.

FIELD OF THE INVENTION

The present invention relates generally to the field of retail point of purchase shelving and displays. More specifically, the present invention is concerned with a corrugated, paperboard upright shelf extender that is manufactured in a fold and glue assembly line and typically provided to an end user in a collapsed or knock-down configuration for easy setup.

BACKGROUND OF THE INVENTION

Corrugated containers are made from pieces of flat paperboard stock material that are die cut into shapes that define various panels. The shapes are folded along predefined lines between the panels with at least one overlapping strip or panel that is glued, taped or otherwise affixed to another panel to form an enclosed boundary. The panels are folded into place to become the walls of the container. The containers are traditionally provided to product manufacturers in a collapsed or knock-down configuration for storage, handling and shipping. The manufacturer opens the knock-down containers and folds appropriately to utilize the assembled container for packing products therein.

The knock-down containers are typically manufactured by feeding flat die cut sheets through a fold-and-glue machine. The fold-and-glue machine applies adhesive and folds over select panels so that the panels are in the knock-down configuration.

Many retailers, such as grocery stores, convenience stores, department stores, etc., display products to their customers on metal shelving units positioned throughout the retail floor space. These metal shelving units often include one or more vertical support post. Each vertical support post defines an inner area and a plurality of spaced-apart keyholes. The keyholes are configured to receive mounting lugs such that when a mounting lug is received by a keyhole, a portion of the mounting lug is positioned within the inner area of the vertical support and a portion of the mounting lug is positioned such that the mounting lug is capable of supporting at least a portion of a shelf. The keyholes of adjacent vertical support posts are positioned relative to each other such that a single shelf can be supported by a plurality of vertical support posts at a variety of heights without adjusting the height of any of the vertical support posts or adjusting the location of any of the keyholes.

Often retailers will include signage at the top of shelving utilizing an upright pole extender that fits into the top of a vertical support post. Such upright pole extenders are traditionally made out of metal in much the same manner as the support posts for the shelves themselves. Often, an upright extender includes a lower end that has a smaller diameter/dimension than the upper end of the extender. In this manner, the lower end fits within the inner area of the vertical support post tubing, while the outer surface of the upper end is generally flush with the outer surface of the support post. The upper end of the extender further includes a number of keyholes for accepting mounting lugs of the signage that is attached to the shelf extenders.

Metal shelf extenders are relatively heavy, non-recyclable, and expensive to manufacture. These shelf extenders can be easily damaged and often are inadvertently discarded with the signage. In addition, because of the expense, metal shelf extenders of the prior art are typically intended to be reused multiple times. Thus, in most cases the signage must be assembled onsite at the retail sales floor, adding to the amount of labor and expense required at the retail location. Therefore, it would be beneficial to provide an upright shelf extender and method of making the same out of corrugated paperboard material, such that the shelf extender can be manufactured in a less-costly manner and is capable of being recycled.

SUMMARY OF THE INVENTION

The present invention comprises a corrugated paperboard upright shelf extender. In some embodiments, the shelf extender is made from a single piece of corrugated material that is precut to result in the design shown in FIG. 1 that includes multiple panels that fold against and/or around one another. In some such embodiments, the panels are separated by pre-perforated lines for easier folding and assembly.

The shelf extender of the inventive concept provides a lower cost alternative to those of the prior art. In addition, the shelf extender of the inventive concept is made of recyclable materials. In some embodiments, the shelf extender of the inventive concept is provided to retailers in a knockdown form and assembled on site on the retail floor. In other embodiments, the shelf extender is assembled at an alternative location along with the signage. Because the shelf extender is made of recyclable material, the shelf extender can be discarded along with the signage when the signage is no longer in use by the retailer. This can result in significant labor savings by the retailer or other end user.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 3B is an enlarged sectional view taken along line 3B-3B.

FIG. 3C is an enlarged sectional view taken along line 3C-3C.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
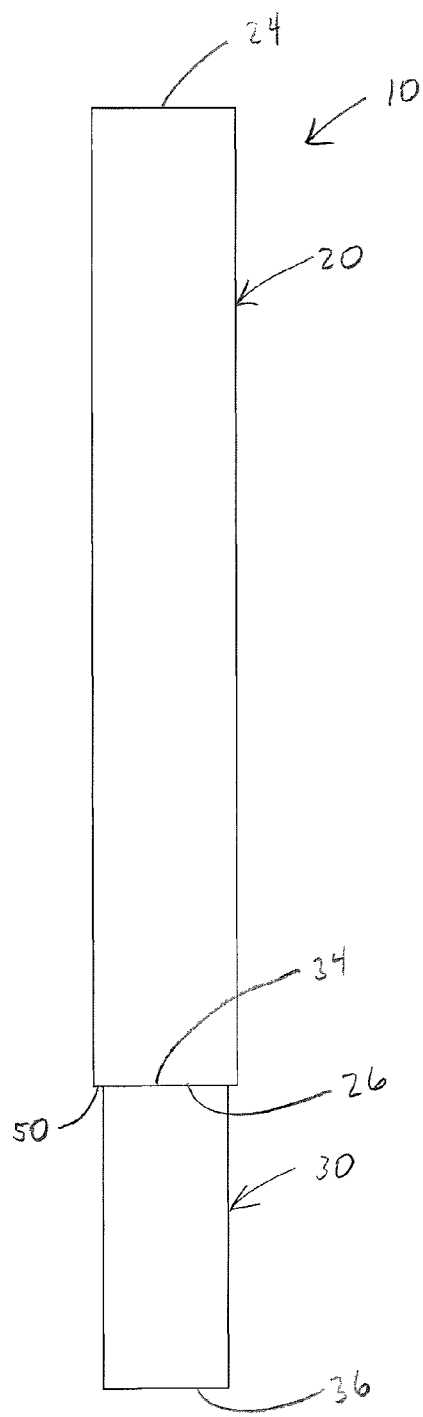
FIG. 2 is a side view of an upright shelf extender of an embodiment of the inventive concept.
Figure 3A:
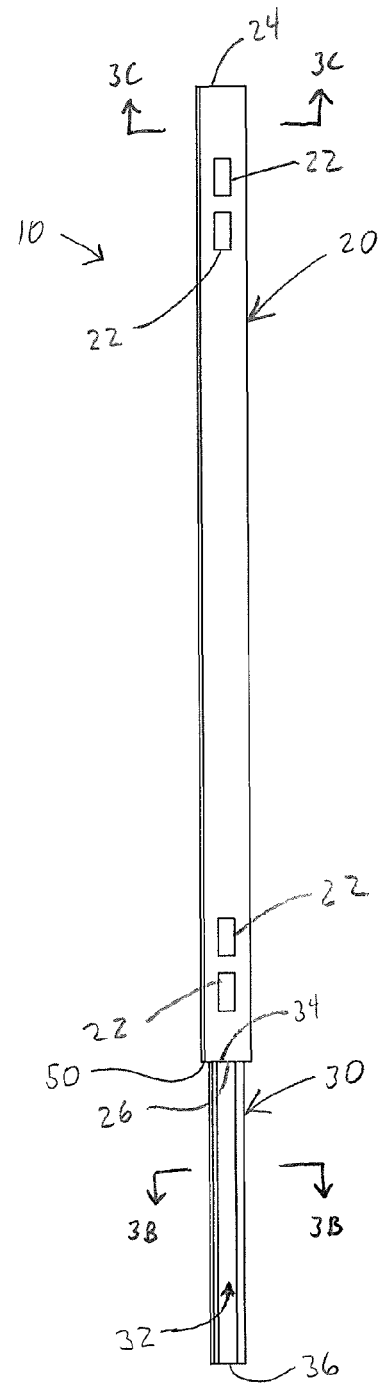
FIG. 3A is a front view of the upright shelf extender of FIG. 2.

Referring to FIGS. 2 and 3, the shelf extender 10 includes an upper section 20 and a lower section 30. In some embodiments, the upper 20 and lower 30 sections define relatively consistent cross sections with the cross section of the lower section 30 being somewhat smaller than the cross section of the upper section 20 such that the transition from the upper section 20 to the lower section 30 generally defines a ledge 50. More specifically, the cross section of the upper section 20 of the shelf extender 10 defines approximately the same exterior surfaces as a cross section of a vertical support post (not shown) of a shelving unit (not shown) while the cross section of the lower section 30 of the shelf extender 10 defines a profile that is configured to be received within an inner area (not shown) of the vertical support post.

In use, the lower section 30 of the shelf extender 10 is inserted into the inner area of the vertical support post of an existing shelving unit with the upper section 20 of the shelf extender 10 extending vertically above the vertical support post such that the shelf extender 10 of the present invention is supported by the vertical support post of the shelving unit. In some embodiments, the ledge 50 of the shelf extender 10 nests against a top edge (not shown) of the vertical support post.

The upper 20 and lower 30 sections include respective top 24, 34 and bottom 26, 36 ends. In some embodiments, the bottom end 26 of the upper section 20 is adjacent to the top end 34 of the lower section 30 such that the transition from the upper section 20 to the lower section 30 defines the ledge 50. In some such embodiments, the top end 24 of the upper section 20 is displaced upwardly from the ledge 50 and the bottom end 36 of the lower section 30 is displaced downwardly from the ledge 50.

In some embodiments, the upper section 20 of the shelf extender 10 defines one or more feature that is configured to assist in utilizing the shelf extender 10 to support signage or the like. In some such embodiments, the feature is a keyhole 22 that is configured to receive a mounting lug (not shown). In other such embodiments, a plurality of keyholes are strategically positioned between the top 24 and bottom 26 ends of the upper section 20 of the shelf extender 10. It will be appreciated that, in still other embodiments, one or more other features that are well known in the art are utilized instead of, or in addition to, one or more keyhole 22.

In some embodiments, the lower section 30 of the shelf extender 10 defines a channel 32. In some such embodiments, the channel 32 is configured so as to provide clearance within the inner area of the vertical support post for various features used in conjunction with the vertical support post. More particularly, in some such embodiments, the channel 32 is configured such that when the lower section 30 of the shelf extender 10 is received by a vertical support post, the lower section 30 of the shelf extender 10 does not prevent a mounting lug from being received by a keyhole of the vertical support post. Furthermore, the channel 32 is configured such that when a mounting lug is received by a keyhole of a vertical support post, the mounting lug does not prevent the lower section 30 of the shelf extender 10 from being received by the vertical support post. Furthermore still, the channel 32 is configured such that when the lower section 30 of the shelf extender 10 is received by a vertical support post and a mounting lug is received by a keyhole of the vertical support post, the mounting lug does not prevent the lower section 30 of the shelf extender 10 from being removed from the vertical support post and the lower section 30 of the shelf extender 10 does not prevent the mounting lug from being removed from the keyhole. In this way, the shelf extender 10 does not prevent the vertical support post from supporting shelving and shelving does not prevent the vertical support post from supporting the shelf extender 10. It will be appreciated that in various embodiments the mounting lug will be one or more tab, bracket, clip, or any number of one or more other features that are well known in the art for being inserted into keyholes so as to support shelving and/or to otherwise display products.

In some embodiments of the present invention, the shelf extender 10 includes an elongated outer portion 100 that extends from the top end 24 of the upper section 20 to the bottom end 26 of the upper section 20. In some such embodiments, the outer portion 100 includes opposed front 110 and rear 120 panels extending between the top 24 and bottom 26 ends of the upper section 20 and opposed side panels 130 extending between the opposed front 110 and rear 120 panels so as to define an elongated inner area 150. In some such embodiments, a cross section of the outer portion 100 generally defines a rectangular tube.

In some embodiments of the present invention, the shelf extender 10 further includes an elongated inner portion 200 that extends from a bottom end 36 of the lower section 30, past the top end 34 of the lower section 30, towards the top end 24 of the upper section 20. In some such embodiments, the inner portion 200 extends to the top end 24 of the upper section 20. Some embodiments of the inner portion 200 includes opposed side panels 230 extending between the top 140 and bottom 150 ends and a rear panel 220 extending between the opposed side panels 230 so as to define a channel 32. In some such embodiments, a cross section of the inner portion 200 generally defines a U-shape.

In some embodiments of the present invention, the inner portion 200 includes an upper portion 202 nested within the inner area 150 of the outer portion 100 and a lower portion 203 extending beyond the outer portion 100 of the shelf extender 10 such that the upper section 20 of the shelf extender 10 comprises the outer portion 100 and the upper portion 202 of the inner portion 200 while the lower section 30 of the shelf extender 10 comprises the lower portion 203 of the inner portion 200.

The present invention further includes various methods of manufacturing a shelf extender 10. One such method includes die-cutting a continuous piece of corrugated material into a design (such as the design shown in FIG. 1) that includes multiple panels that fold against and/or around one another. In some embodiments, the panels are separated by pre-perforated lines for easier folding and assembly. In some such embodiments, the shelf extender 10 is shipped in a flat (knock-down) configuration, for ease of storage and shipping, and then moved to a three-dimensional configuration prior to being used to support signage or the like.

Figure 1:
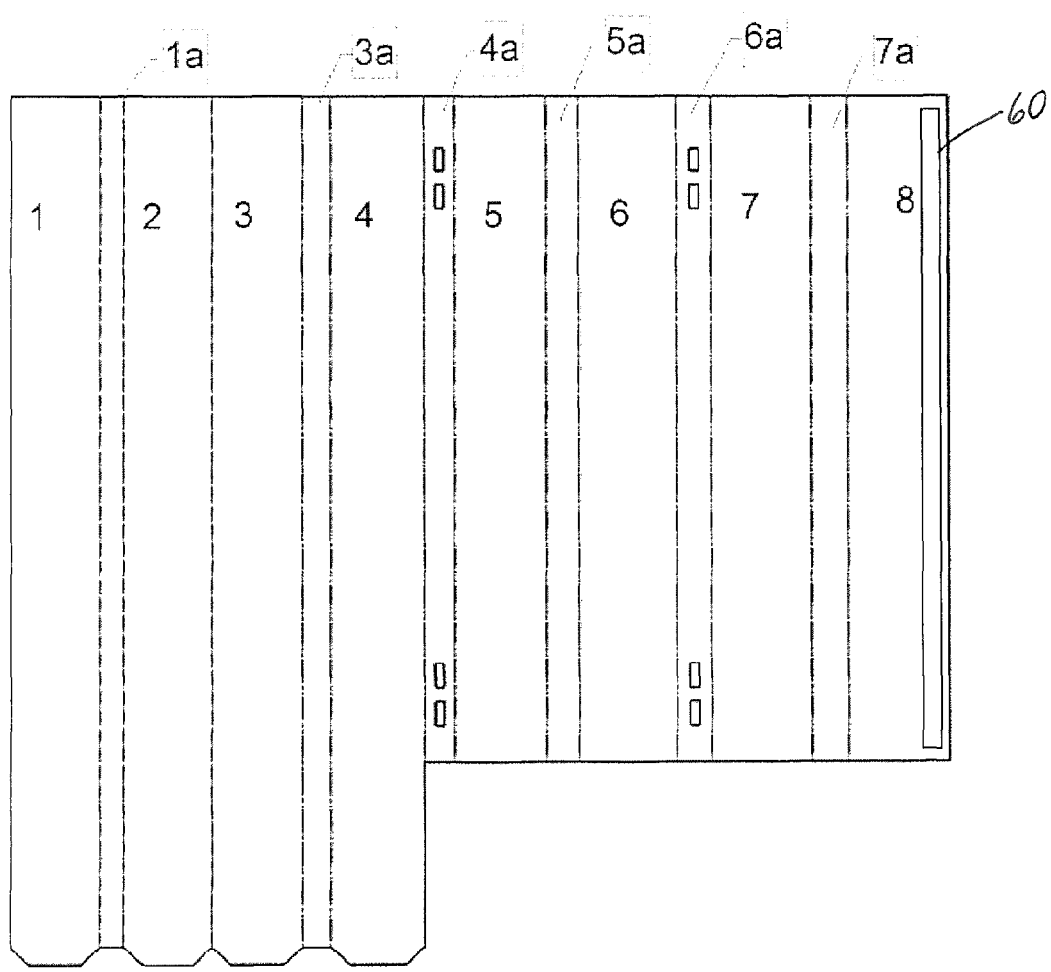
FIG. 1 is a top view of a flat piece of corrugated material that has been die cut and pre-creased and/or perforated to form a knockdown for an upright shelf extender of an embodiment of the inventive concept.

FIG. 1 shows one example of the present invention in a flat configuration laying on a planar surface, such as a table surface. Specifically, the embodiment includes multiple panels separated by perforated lines for easier folding and assembly. The shelf extender 10 is moved to the three-dimensional configuration by first folding a first primary panel 1, a first secondary panel 1a, and a second primary panel 2 up and over until panels 1, 1a, and 2 rest against a fourth primary panel 4, a third secondary panel 3a, and a third primary panel 3, respectively. In the presently described embodiment, there is no second secondary panel 2a (not shown). Panels 2 and 3 are then folded up approximately 90 degrees such that panels 2 and 3 extend generally perpendicularly from the table surface. Next, panels 1a and 3a are folded up approximately 90 degrees such that panels 1a and 2a extend generally perpendicularly from the table surface, thereby moving panels 2 and 3 into a position and orientation that is displaced from and generally parallel with panels 1 and 4. In this way, panels 1, 1a, 2, 3, 3a, and 4, together, define the inner portion 200 of the shelf extender 10, with panels 1a and 3a, together, defining the rear panel 220; and panels 1 and 4, together, and panels 2 and 3, together, defining opposed side panels 230.

After the inner portion 200 of the shelf extender 10 is formed, as discussed above, the remaining panels are then folded/wrapped around the assembly to form the outer portion 100 of the shelf extender 10. Specifically, a fourth secondary panel 4a is folded up approximately 90 degrees such that panel 4a extends between the opposed side panels 230 of the inner portion 200 of the shelf extender 10, followed by a fifth primary panel 5 being folded over panel 3, a fifth secondary panel 5a being folded over panel 3a, a sixth primary panel 6 being folded over panel 4, a sixth secondary panel 6a being folded over panel 4a, a seventh primary panel 7 being folded over panel 5, a seventh secondary panel 7a being folded over panel 5a, and finally an eighth primary panel 8 being folded over panel 6. In this way, panels 4a, 5, 5a, 6, 6a, 7, 7a, and 8, together, define the outer portion 100 of the shelf extender 10 with panels 4a and 6a, together, defining the front panel 110; panels 5 and 7, together, and panels 6 and 8, together, defining opposed side panels 130; and panels 5a and 7a, together, defining the rear panel 120.

In some embodiments, panel 8 includes an adhesive strip 60. In such embodiments, prior to folding panel 8 against panel 6, the backing from the adhesive strip 60 is removed to expose the adhesive. Panel 8 is then adhered to panel 6 using the adhesive and holding the entire assembly together.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A method of making a corrugated shelf extender comprising:
   die-cutting a continuous piece of flat corrugated material into a design that includes multiple panels;
   a folding step that includes: folding the continuous piece of flat corrugated material into a three-dimensional shelf extender, wherein the shelf extender includes a lower section that is configured to be received by an inner area of a vertical support, the lower section comprising opposed side panels and a rear panel extending between the opposed side panels such that the lower section defines a channel having an open front, and wherein the shelf extender includes an upper section that extends above the vertical support post when said lower section is received by the inner area of the vertical support post;
   wherein the folding step comprises: folding a first primary panel, a first secondary panel, and a second primary panel up and over until said first primary panel rests against a fourth primary panel, said first secondary panel rests against a third secondary panel, and said second primary panel rests against a third primary panel;
   wherein said first, second, third, and fourth primary panels together with said first and third secondary panels define an inner portion of the shelf extender, and wherein the design of the continuous piece of flat corrugated material includes:
   said first secondary panel extending between said first and second primary panels; said third secondary panel extending between said third and fourth primary panels; and said second primary panel extending between said first secondary panel and said third primary panel; and
   folding a fourth secondary panel up approximately 90 degrees so that the fourth secondary panel extends from said first and fourth primary panels to said second and third primary panels;
   folding a fifth primary panel over said third primary panel; folding a fifth secondary panel over said third secondary panel; folding a sixth primary panel over said fourth primary panel; folding a sixth secondary panel over said fourth secondary panel; folding a seventh primary panel over said fifth primary panel; folding a seventh secondary panel over said fifth secondary panel; and folding an eighth primary panel over said sixth primary panel,
   wherein said fifth, sixth, seventh, and eighth primary panels together with said fourth, fifth, sixth, and seventh secondary panels define an outer portion of the shelf extender, and wherein the design of the continuous piece of flat corrugated material includes: said fourth secondary panel extending between said fourth and fifth primary panels; said fifth secondary panel extending between said fifth and sixth primary panels; said sixth secondary panel extending between said sixth and seventh primary panels; and said seventh secondary panel extending between said seventh and eighth primary panels.

2. The method of claim 1, further comprising perforating the corrugated material between the multiple panels so as to make it easier to fold the continuous piece of flat corrugated material into a three-dimensional shelf extender.

3. The method of claim 1, wherein the folding step comprises:
   folding said second and third primary panels up approximately 90 degrees such that said second and third primary panels are generally perpendicular to the rest of the panels; and
   folding said first and third secondary panels up approximately 90 degrees until said first and third secondary panels are generally perpendicular to the rest of the panels, thereby moving said second and third primary panels into a position and orientation that is displaced from and generally parallel with said first and fourth primary panels.

4. The method of claim 1, wherein said inner portion of the shelf extender defines an open channel having opposed side panels, a rear panel extending between the opposed side panels, and an open front, wherein: said second and third primary panels of said inner portion of the shelf extender form at least part of a first of the opposed side panels of the bottom portion of the shelf extender; said first and fourth primary panels of said inner portion of the shelf extender form at least part of a second of the opposed side panels of the bottom portion of the shelf extender; and said first and third secondary panels of said inner portion of the shelf extender form at least part of the rear panel of the bottom portion of the shelf extender.

5. The method of claim 4, wherein said open channel is configured so as to provide clearance for a mounting lug to be received by a keyhole of the vertical support post when said lower section of the shelf extender is received by the vertical support post.

6. The method of claim 4, wherein said open channel is configured so as to provide clearance for said lower section of the shelf extender to be received by the vertical support post when a mounting lug is received by a keyhole of the vertical support post.

7. The method of claim 1, wherein the shelf extender defines a ledge at the intersection between the upper section and the lower section and wherein the ledge of the shelf extender nests against a top edge of the vertical support post when the lower section is received by the inner area of the vertical support post.

* * * * *